(12) United States Patent
Petellaz

(10) Patent No.: US 9,410,434 B2
(45) Date of Patent: Aug. 9, 2016

(54) PROPELLER BLADE WITH SPAR RIB

(71) Applicant: Ratier-Figeac SAS, Figeac (FR)

(72) Inventor: Bruno Petellaz, Lot (FR)

(73) Assignee: RATIER-FIGEAC SAS, Figeac (FR)

( * ) Notice: Subject to any disclaimer, the term of this patent is extended or adjusted under 35 U.S.C. 154(b) by 469 days.

(21) Appl. No.: 13/904,371

(22) Filed: May 29, 2013

(65) Prior Publication Data
US 2013/0323068 A1 Dec. 5, 2013

(30) Foreign Application Priority Data
May 29, 2012 (EP) ..................................... 12305590

(51) Int. Cl.
| *B64C 11/26* | (2006.01) |
| *F01D 5/14* | (2006.01) |
| *F03D 1/06* | (2006.01) |
| *F03D 3/06* | (2006.01) |

(52) U.S. Cl.
CPC ............... *F01D 5/147* (2013.01); *B64C 11/26* (2013.01); *F03D 1/0675* (2013.01); *F03D 3/062* (2013.01); *F05B 2240/301* (2013.01); *F05D 2240/301* (2013.01); *Y02E 10/721* (2013.01)

(58) Field of Classification Search
CPC ........ B64C 11/22; B64C 11/24; B64C 11/26; F03D 1/0633; F03D 1/065; F03D 1/0675; F03D 1/0683; F03D 3/061; F03D 3/062; F05D 2240/301; F05D 2240/305; F05D 2240/306; F05B 2240/301
See application file for complete search history.

(56) References Cited

U.S. PATENT DOCUMENTS

| 2,767,461 | A | * | 10/1956 | Lebold | B21D 53/78 264/46.6 |
| 4,281,966 | A | * | 8/1981 | Duret | B29D 99/0025 416/134 A |
| 4,302,155 | A | * | 11/1981 | Grimes | B64C 11/26 416/144 |
| 4,626,172 | A | * | 12/1986 | Mouille | B29D 99/0025 416/134 A |
| 4,648,921 | A | * | 3/1987 | Nutter, Jr. | B29C 70/08 156/242 |
| 4,806,077 | A | * | 2/1989 | Bost | B64C 27/473 416/144 |
| 4,935,277 | A | * | 6/1990 | Le Balc'h | B64C 27/473 244/123.5 |
| 5,096,384 | A | * | 3/1992 | Immell | B29C 70/345 156/172 |
| 5,127,802 | A | * | 7/1992 | Carlson | B29C 44/18 29/889.71 |
| 5,222,297 | A | * | 6/1993 | Graff | B29C 70/865 29/889.7 |
| 6,056,838 | A | * | 5/2000 | Besse | B29C 70/48 156/245 |
| 9,139,287 | B2 | * | 9/2015 | Folsom | B64C 11/22 |
| 2011/0100540 | A1 | * | 5/2011 | Mathew | B29D 99/0014 156/245 |
| 2011/0255975 | A1 | * | 10/2011 | Perless | F03D 3/061 416/176 |
| 2013/0280079 | A1 | * | 10/2013 | Smith | B64C 11/26 416/223 R |
| 2013/0323068 | A1 | * | 12/2013 | Petellaz | F01D 5/147 416/226 |
| 2014/0133995 | A1 | * | 5/2014 | Nagle | B64C 11/26 416/226 |
| 2015/0233249 | A1 | * | 8/2015 | Nagle | B29D 99/0025 416/226 |

FOREIGN PATENT DOCUMENTS

| EP | 2317126 A2 | 5/2011 |
| FR | 2542695 A1 | 9/1984 |

OTHER PUBLICATIONS

European Search Report dated Nov. 27, 2012 for Application No. 12305590.7-2422.

* cited by examiner

*Primary Examiner* — Igor Kershteyn
*Assistant Examiner* — Christopher R Legendre
(74) *Attorney, Agent, or Firm* — Cantor Colburn LLP

(57) ABSTRACT

A propeller blade includes a foam core having a groove formed therein, a fibrous material filling at least a portion of the groove and a structural layer that surrounds the fibrous material and at least a portion of the foam core.

12 Claims, 3 Drawing Sheets

PROPELLER BLADE WITH SPAR RIB

PRIORITY CLAIM

This application claims priority to European Patent Application No. 12305590.7, filed May 29, 2012, and all the benefits accruing therefrom under 35 U.S.C. §119, the contents of which in its entirety are herein incorporated by reference.

BACKGROUND OF THE INVENTION

The present invention relates to propellers and, in particular, to propeller blades that include a rib in the spar core of the propeller blade.

Modern propeller blades typically include root portions which extend into the hub arm of the hub of the propeller system and which are secured to and rotatable relative to the hub arm via a retention assembly. Typically the retention assembly includes one or a plurality of ball bearing assemblies which permit the rotation of the blade in the hub arm for accomplishing pitch change of the blade for altering the speed of the propeller and accordingly, the aircraft.

The blades are typically formed by surrounding a foam spar core with a resin impregnated fabric. Leading and trailing edges of the blade are then formed over the fabric and surrounded by, for example, a Kevlar sock. Such blades are light and effective for their intended purposes.

BRIEF DESCRIPTION OF THE INVENTION

According to one embodiment, a propeller blade that includes a foam core having a groove formed therein, a fibrous material filling at least a portion of the groove and a structural layer that surrounds the fibrous material and at least a portion of the foam core is disclosed.

In another embodiment, a method of forming a propeller blade that includes: forming a foam core, the form core including a groove formed therein; disposing a fibrous material in the groove; and forming a structural layer that surrounds fibrous material and a portion of the foam core is disclosed.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
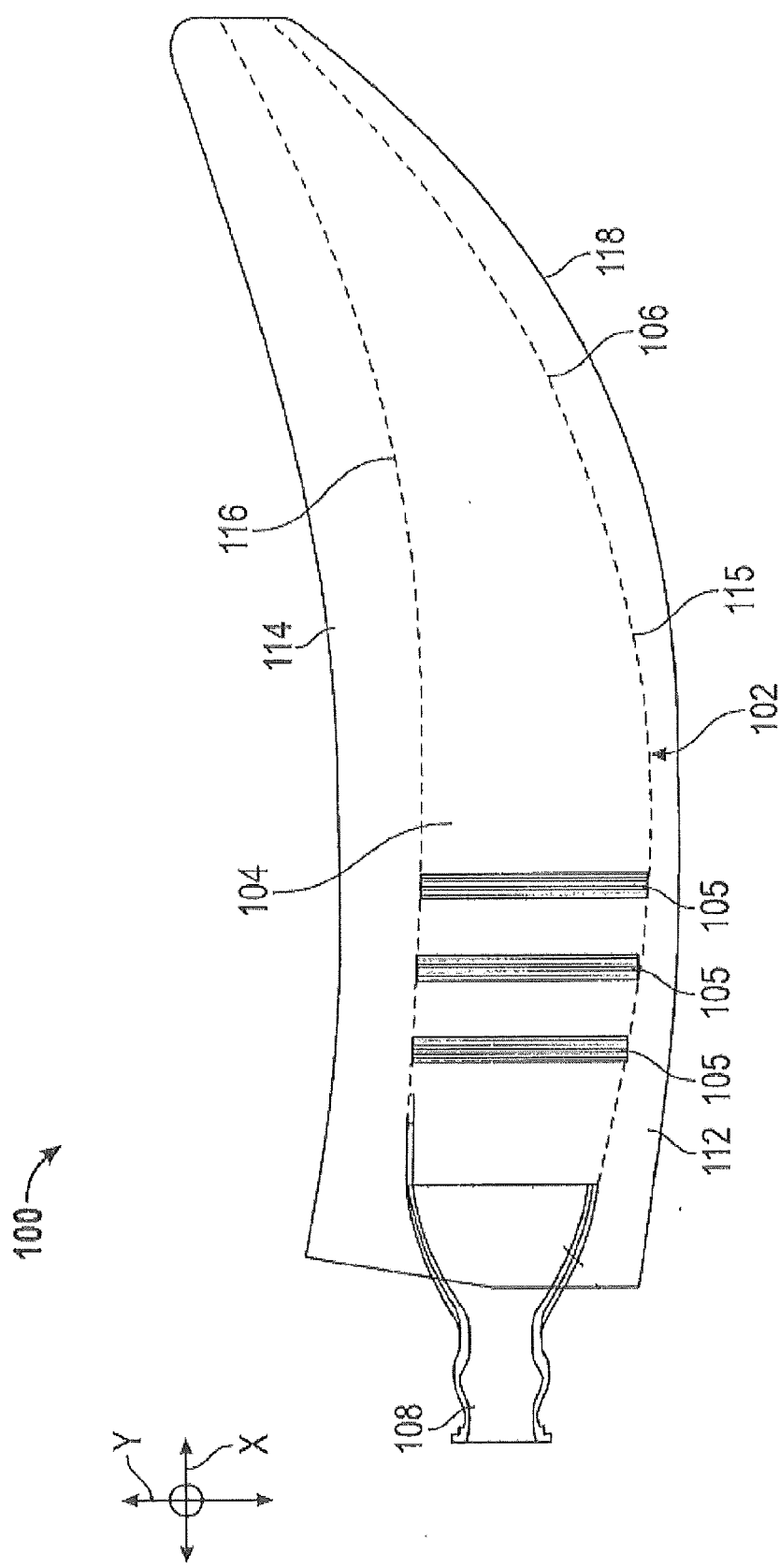
FIG. 1 is a plan-view of a propeller blade according to one embodiment of the present invention.
Figure 2:
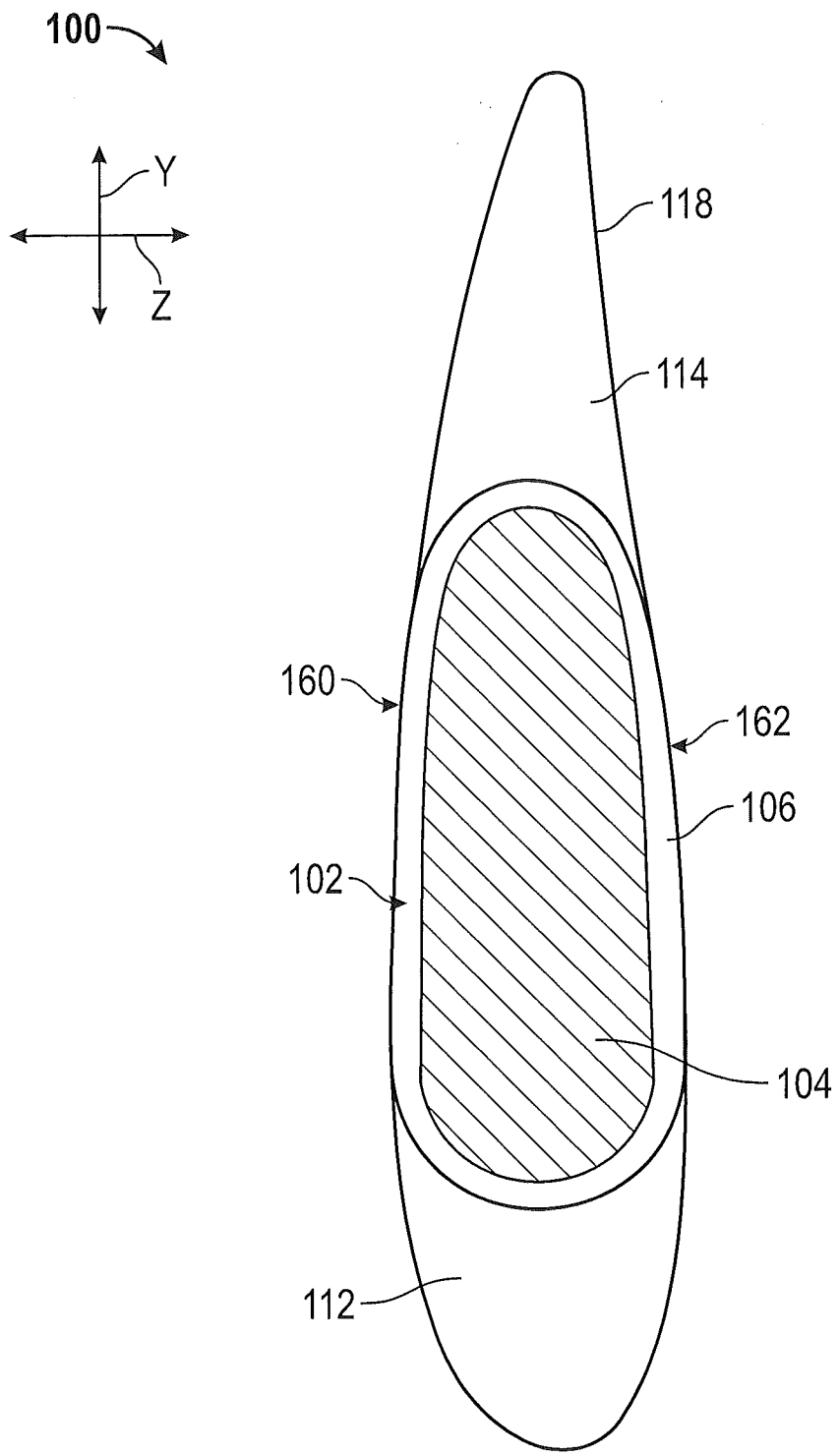
FIG. 2 is a cross-section of the propeller blade shown in FIG. 1.

Referring now to FIGS. 1 and 2, plan and cross-section views of a propeller blade 100 according to one embodiment of the present invention are illustrated. For simplicity, the direction shown by arrow X shall be referred to as the span wise direction herein, the direction shown by arrow Y shall be referred to as the chord wise direction herein and the direction shown by arrow Z shall be referred to as the thickness direction or simply, the thickness. The cross-section shown in FIG. 2 is taken along line A-A.

The blade 100 is formed by first forming a spar 102. The spar 102 includes a spar foam core 104 (core) surrounded by a structural layer 106. The core 104 is typically formed of a foam material that is injected into a mold to form a particular shape. In other embodiments, the core 104 could be machined to define the desired shape. The mold can include a layer of fiberglass or carbon (pre-preg) on the walls thereof to which the foam of the core 104 adheres. As such, the core 104 can be surrounded by a layer (not shown) of fiberglass or carbon in one embodiment but this is not required. The foam that forms the core 104 can be selected from one of: polyurethane (PU), polyisocyanurate, or polymethacrylimide (PMI).

According to one embodiment, the blade 100 includes one or more ribs 105 formed in the spar foam core 104. A more detailed explanation of the ribs 105 is provided below but, in general, the ribs 105 serve to provide stiffness in the thickness direction (e.g., from the camber 160 to the face 162 sides) of the propeller blade 100. In more detail, a propeller blade with high activity factor and large chord wise lengths, has a lower ratio of stiffness in the chord wise direction as compared to stiffness in the span wise direction. When the curvatures of the camber 160 and face 162 sides of the blade 100 are high, secondary bending moments may be generated. The consequences of these secondary bending moments are large deformations and loadings in the direction perpendicular to the chord (e.g., in direction Z in FIG. 2). The ribs 105 can provide structure to reduce or avoid these deformations by locally raising inertia and stiffness of the chord wise direction Y of the spar 104.

The structural layer 106 is typically formed of a dry braided carbon fiber which is subsequently resin injected or a resin-impregnated fabric material (e.g. resin impregnated carbon fiber fabric) and disposed such that it surrounds the core 104 and the ribs 105 (and the fiberglass layer if it is included) by, for example, a braiding process. In one embodiment, the structural layer 106 is impregnated with a resin. In some cases, the spar 102 is heated to set the resin in the structural layer 106. With the inclusion of the ribs 105, the respective leading and trailing edges 115, 116 of the spar 102 are kept in a fixed relation to one another. As such, the possibility of the core 104 cracking may be reduced.

In some instances, the spar 102 is formed such that a portion of it surrounds a root portion 108 that allows the blade 100 to be connected to a hub (not shown). Rotation of the hub causes the blade 100 to rotate and, consequently, causes the generation of thrust to propel an aircraft. In the following discussion, it shall be assumed that the blade 100 rotates in the clockwise direction. The root portion 108 is sometimes referred to as a "tulip" in the industry and is typically formed of a metal.

After the spar 102 is formed, leading edge foam 112 and trailing edge foam 114 are formed on the leading and trailing edges 115, 116 respectively of the spar 102. The leading edge foam 112, trailing edge foam 114 and the spar 102 can then be encased in an outer layer 118. The outer layer 118 can be formed of Kevlar and be in the form of a sock that is pulled over the assembly that includes the leading edge foam 112, trailing edge foam 114 and the spar 102. Of course, the outer layer 118 could be formed in other manners as well.

Figure 3:
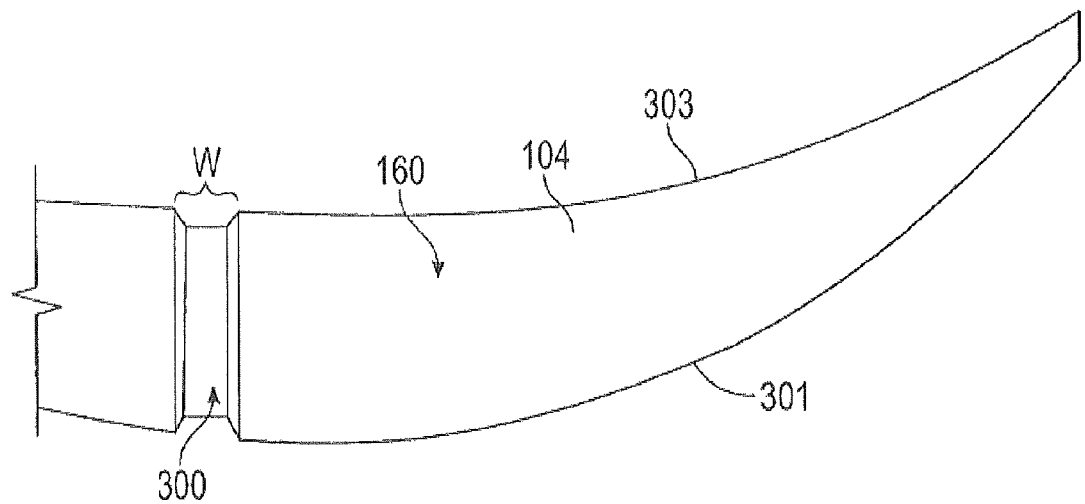
FIG. 3 is a plan-view of a spar core having a groove formed therein.

FIG. 3 is a plan view of the camber side 160 of the spar core 104 that forms blade 100. The spar core 104 includes a groove 300 formed therein. The groove 300 includes a width (w) and a depth (d) that extends into the page. The groove 300 can be formed in a many different manners. For instance, the groove 300 could be part of the mold into which the foam forming the spar core 104 is formed. In another embodiment, the spar core 104 is initially formed without the groove 300 and then the groove 300 is machined or otherwise formed in the core 104. As illustrated, the groove 300 causes depressions in the leading and trailing edges 301, 303 of the core 104. Of course, the groove could be formed such that depressions are only formed in the camber 160 and face 162 sides.

Figure 4:
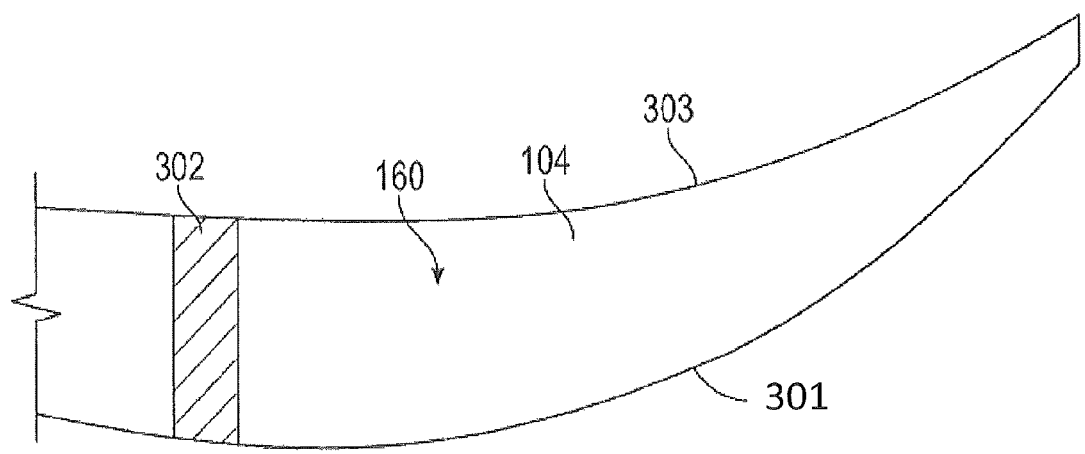
FIG. 4 is a plan-view of the spar core of FIG. 3 with the groove filled with a fibrous material.

Referring now to FIG. 4, the groove 300 has had one or more layers of a fibrous material 302 disposed therein. In one embodiment, the fibrous material 302 is a carbon fiber cloth. In one embodiment, the fibrous material 302 is formed of the same material as is used to form the structural layer 106 (e.g., a resin impregnated cloth or dry braided carbon fiber or cloth). The resin in the fibrous material 302 is eventually cured and the cured combination of the resin and the fibrous material 302 defines the ribs 105 shown in FIG. 1.

The fibrous material 302 could be placed in the groove 300 such that the camber 160 and face 162 sides (including the fibrous material 302) are substantially smooth. That is, the fibrous material 302 can fill the depth (d) of the groove 300 in one embodiment. It shall be understood, that the fibrous material 302 could be formed, for example, by braiding of dry carbon fibers in one embodiment. In another embodiment, the fibrous material 302 is a fibrous cloth and may include resin in it or not.

Only one groove 300 has been shown in FIGS. 3-4 but that is by way of example, not limitation. The number and location of the grooves 300 is a matter of design choice that may be decided by the skill artisan after examination of this disclosure.

In the manner described above, after the fibrous material 302 has been placed, the spar core 104 shown in FIG. 4 can have the structural layer 106 formed over it by first braiding a dry carbon fiber over the spar core 104 and fibrous material 302. A resin can then be injected into the structural layer 106 and the fibrous material 302. In this manner, the material can be made rigid and become the spar ribs 105 described above.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A propeller blade comprising:
    a foam core having leading and trailing edges and camber and face sides, the foam core further including a groove formed in all of the leading and trailing edges and camber and face sides;
    a fibrous material filling at least a portion of the groove; and
    a structural layer that surrounds the fibrous material and at least a portion of the foam core.

2. The propeller blade of claim 1, further comprising:
    a layer of fiberglass or carbon at least partially disposed between the foam core and the fibrous material.

3. The propeller blade of claim 1, wherein the groove has a depth and the fibrous material fills the depth of the groove.

4. The propeller blade of claim 1, further comprising:
    a root disposed within the structural layer at an end of the propeller blade.

5. The propeller blade of claim 1, wherein the foam core is formed of one or more of: polyurethane (PU), polyisocyanurate, and polymethacrylimide (PMI).

6. The propeller blade of claim 1, wherein the structural layer is formed of a resin-impregnated fiber material.

7. The propeller blade of claim 6, wherein the fibrous material is formed of the same material as the structural layer.

8. The propeller blade of claim 1, wherein the fibrous material is formed of carbon fibers.

9. The propeller blade of claim 1, wherein both the fibrous material and the structural layer have a resin disposed therein.

10. A method of forming a propeller blade comprising:
    forming a foam core, the form core including leading and trailing edges and camber and face sides, the foam core further including a groove formed in all of the leading and trailing edges and camber and face sides;
    disposing a fibrous material in the groove; and
    forming a structural layer that surrounds the fibrous material and a portion of the foam core.

11. The method of claim 10, further comprising:
    injecting a resin into the fibrous material and the structural layer; and
    curing the resin.

12. The method of claim 10, wherein forming the foam core includes:
    forming an initial core in a mold; and
    machining the initial mold to form the groove.

* * * * *